(12) United States Patent
Diard

(10) Patent No.: US 7,525,547 B1
(45) Date of Patent: Apr. 28, 2009

(54) PROGRAMMING MULTIPLE CHIPS FROM A COMMAND BUFFER TO PROCESS MULTIPLE IMAGES

(75) Inventor: Franck R. Diard, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 776 days.

(21) Appl. No.: 11/016,011

(22) Filed: Dec. 17, 2004

Related U.S. Application Data

(63) Continuation-in-part of application No. 10/639,893, filed on Aug. 12, 2003, now Pat. No. 7,015,915.

(51) Int. Cl.
*G06F 15/16* (2006.01)
*G06T 1/00* (2006.01)

(52) U.S. Cl. .................... 345/502; 345/522
(58) Field of Classification Search ............. 345/501, 345/502, 505, 522, 503
See application file for complete search history.

(56) References Cited

U.S. PATENT DOCUMENTS

| | | | |
|---|---|---|---|
| 5,251,295 A * | 10/1993 | Ikenoue et al. | 345/504 |
| 5,337,410 A * | 8/1994 | Appel | 345/501 |
| 5,790,130 A | 8/1998 | Gannett | |
| 5,841,444 A | 11/1998 | Mun | |
| 6,023,281 A | 2/2000 | Grigor et al. | |
| 6,078,339 A | 6/2000 | Meinerth et al. | |
| 6,191,800 B1 | 2/2001 | Arenburg et al. | |
| 6,259,461 B1 | 7/2001 | Brown | |
| 6,317,133 B1 | 11/2001 | Root et al. | |
| 6,362,818 B1 | 3/2002 | Gardiner et al. | |
| 6,445,391 B1 | 9/2002 | Sowizral et al. | |
| 6,466,218 B2 * | 10/2002 | Parikh et al. | 345/522 |
| 6,469,746 B1 | 10/2002 | Maida | |
| 6,473,086 B1 | 10/2002 | Morein et al. | |

(Continued)

FOREIGN PATENT DOCUMENTS

EP    0571969    5/2003

OTHER PUBLICATIONS

John Torborg, "A parallel processor architecture for graphics arithmetic operations", Jul. 1987, Computer Graphics, vol. 21, No. 4, pp. 197-204.*

(Continued)

*Primary Examiner*—Ryan R Yang
(74) *Attorney, Agent, or Firm*—Townsend and Townsend and Crew LLP

(57) ABSTRACT

Methods, apparatuses, and systems are presented for operating a plurality of graphics devices involving using the graphics devices to processes a sequence of images, wherein at least one first graphics device processes a first image, and at least one second graphics device processes a second image, communicating a first command associated with the first image to the at least one first graphics device and the at least one second graphics device, wherein the first command is to be executed by the at least one first graphics device and the at least one second graphics device, and communicating a second command associated with the first image to the at least one first graphics device and the at least one second graphics device, wherein the second command is to be executed by the at least one first graphics device but not by the at least one second graphics device.

19 Claims, 10 Drawing Sheets

U.S. PATENT DOCUMENTS

| | | | |
|---|---|---|---|
| 6,570,571 | B1 | 5/2003 | Morzumi |
| 6,700,581 | B2 * | 3/2004 | Baldwin et al. ............. 345/519 |
| 6,724,390 | B1 | 4/2004 | Dragony et al. |
| 6,731,288 | B2 * | 5/2004 | Parsons et al. .............. 345/502 |
| 6,747,654 | B1 | 6/2004 | Laksono et al. |
| 6,781,590 | B2 | 8/2004 | Katsura et al. |
| 6,806,875 | B2 * | 10/2004 | Nakatsuka et al. .......... 345/426 |
| 7,015,915 | B1 * | 3/2006 | Diard .......................... 345/522 |
| 2003/0128216 | A1 | 7/2003 | Walls et al. |
| 2004/0075623 | A1 | 4/2004 | Hartman |
| 2005/0012749 | A1 | 1/2005 | Gonzalez |
| 2005/0088445 | A1 | 4/2005 | Gonzalez |

OTHER PUBLICATIONS

Whitman, "Dynamic Load Balancing For Parallel Polygon Rendering" IEEE Computer Graphics and Applications, IEEE Inc. New York, U.S. vol. 14, No. 4, pp. 41-48, Jul. 1, 1994.

* cited by examiner

PROGRAMMING MULTIPLE CHIPS FROM A COMMAND BUFFER TO PROCESS MULTIPLE IMAGES

CROSS-REFERENCES TO RELATED APPLICATIONS

The present application is a continuation-in-part of U.S. patent application Ser. No. 10/639,893, titled "PROGRAMMING MULTIPLE CHIPS FROM A COMMAND BUFFER," filed Aug. 12, 2003, the entire disclosure of which is hereby incorporated by reference for all purposes.

The present application is related to the following U.S. patent applications, which are assigned to NVIDIA Corporation, the assignee of the present invention, and the disclosures of which are hereby incorporated by reference for all purposes:

U.S. application Ser. No. 10/990,712, filed Nov. 17, 2004, entitled "CONNECTING GRAPHICS ADAPTERS FOR SCALABLE PERFORMANCE".

U.S. patent application Ser. No. 11/012,394, filed Dec. 15, 2004, entitled "BROADCAST APERTURE REMAPPING FOR MULTIPLE GRAPHICS ADAPTERS".

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

To maximize rendering performance, the graphics processing subsystem may include two or more graphics processing units (GPUs) operating in parallel. The graphics processing units can divide the rendering workload in a number of different ways. For example, different portions of an image can be rendered in parallel by different GPUs. The portions are then combined to produce a complete rendered image. In another example parallel rendering scheme, each GPU renders one image in a sequence of images.

Programming multiple GPUs with a CPU is one difficulty arising from parallel rendering schemes. In parallel rendering schemes, GPUs require a mixture of rendering commands common to all of the GPUs in the graphics processing subsystem and rendering commands specific to each GPU. However, programming each GPU with different rendering commands and data often requires a large allocation of system resources for each GPU. This programming overhead makes parallel rendering schemes inefficient and in some cases even limits the total number of GPUs that can be used by the graphics processing subsystem.

Therefore, it is desirable to have an efficient system and method for programming multiple graphics processing units with rendering commands while consuming a minimal amount of system resources. It is further desirable to be able to program multiple graphics processing units with both rendering commands common to all of the graphics processing units and rendering commands specific to one or more graphics processing units.

BRIEF SUMMARY OF THE INVENTION

The present invention relates to methods, apparatuses, and systems for operating a plurality of graphics devices involving using the plurality of graphics devices, including at least one first graphics device and at least one second graphics device, to process a sequence of images, including a first image and a second image, wherein the at least one first graphics device processes the first image, and the at least one second graphics device processes the second image, communicating a first command associated with the first image to the at least one first graphics device and the at least one second graphics device, wherein the first command is to be executed by the at least one first graphics device and by the at least one second graphics device, and communicating a second command associated with the first image to the at least one first graphics device and the at least one second graphics device, wherein the second command is to be executed by the at least one first graphics device but not by the at least one second graphics device.

According to one embodiment of the invention, the first command is preceded by a first prior command designating the at least one first graphics device and at least one second graphics device to execute the first command, and the second command is preceded by a second prior command designating the at least one first graphics device to execute the second command. The first prior command may designate the at least one first graphics device by utilizing a first bit position in the first prior command, the first prior command may designate the at least one second graphics device by utilizing a second bit position in the first prior command, and the second prior command may designate the at least one first graphics device by utilizing a first bit position in the second prior command. The first command and second command may be communicated to the at least one first graphics device and at least one second graphics device via a single memory aperture. Each of the at least one first graphics device and at least one second graphics device may comprise a graphics processing unit (GPU).

The first command may comprise a state command associated with the first image, and the second command may comprise a rendering command associated with the first image. The state command may relate to selection of a current drawing color, selection of a current texture to be used in texturing operations, selection of a current view point, selection of a current pixel shader program, etc. The rendering command may relate to drawing of at least one geometric shape, clearing of a rectangular area in an image, etc.

DETAILED DESCRIPTION OF THE INVENTION

Figure 1:
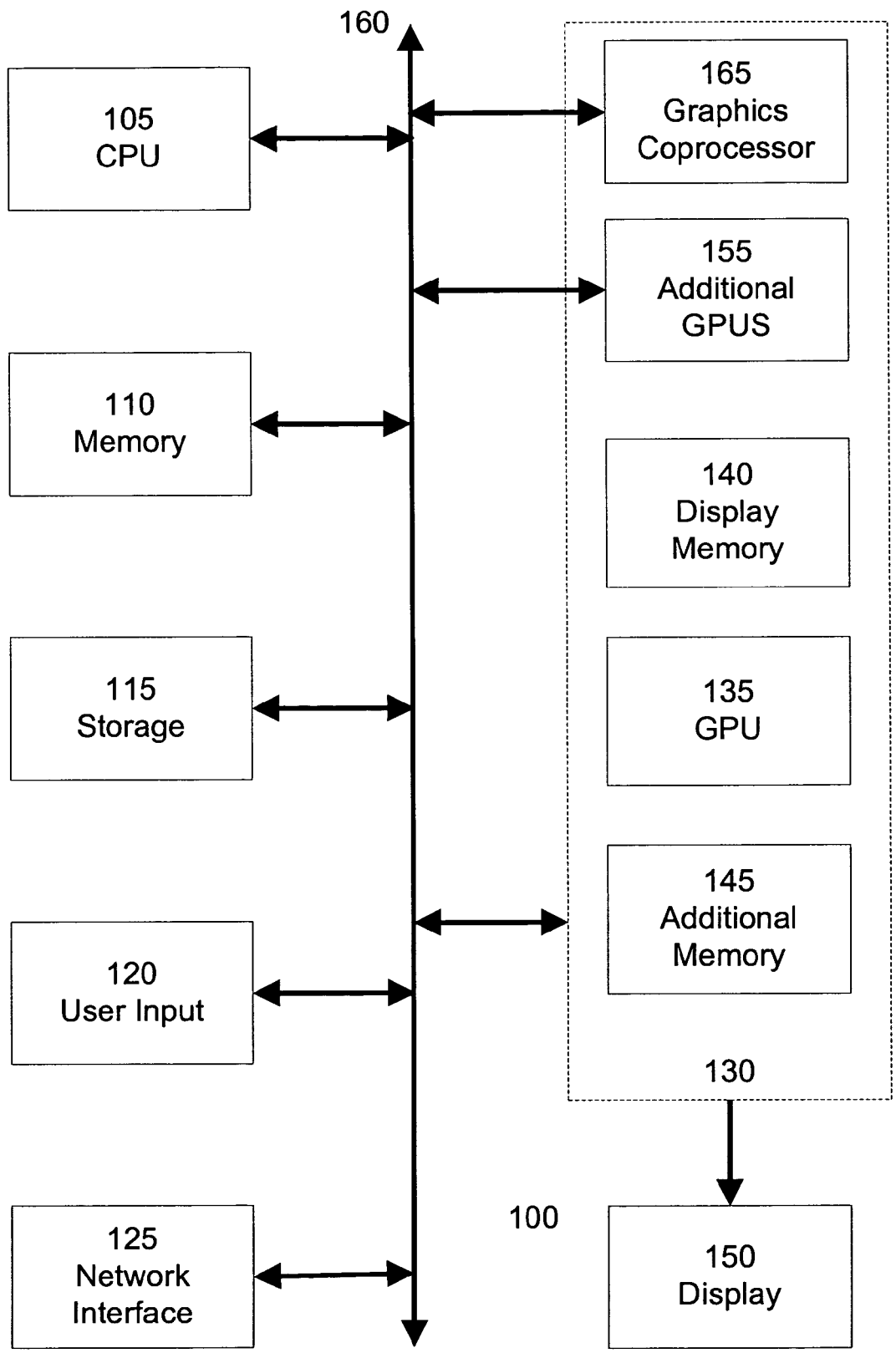
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X, and Hypertransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and additional GPUs 155.

Additional GPUs 150 can be located on the same circuit board as GPU 135 and sharing a connection with GPU 135 to data bus 160, or can be located on additional circuit boards separately connected with data bus 160. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge chip used to control the data bus 160.

Figure 2A:
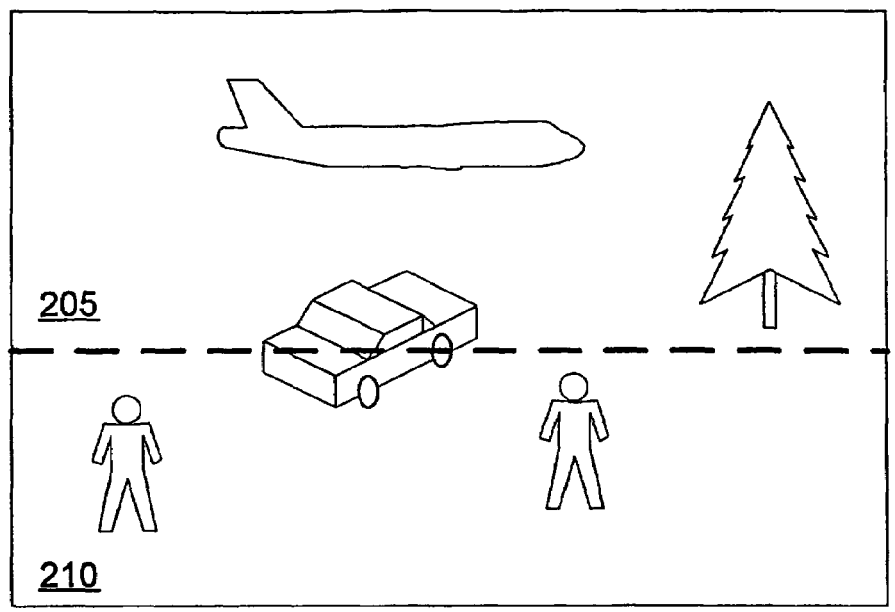
FIGS. 2A and 2B illustrate a method for rendering portions of an image in parallel and a prior system for programming graphics processing units to perform the same.
Figure 2B:
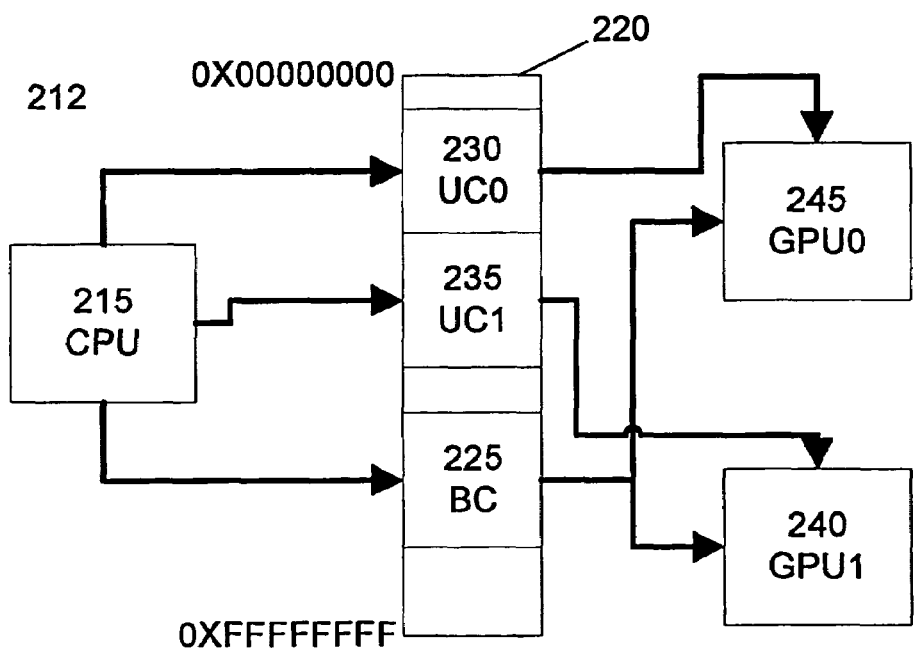

FIGS. 2A and 2B illustrate a method for rendering portions of an image in parallel and a prior system for programming graphics processing units to perform the same. Image 200 represents an example output image to be rendered by two or more GPUs operating in parallel. Image 200 is rendered by splitting the image into different portions, with each portion rendered by at least one GPU. In this example, image portion 205 is rendered by a first GPU and image portion 210 is rendered by a second GPU.

In general, split-frame parallel rendering schemes such as that illustrated by FIG. 2A require GPUs to be programmed with a combination of common rendering commands, which are executed by all of the GPUs of the system, and specific rendering commands, which are executed by a subset of the GPUs of the system. In the example of FIG. 2A, both GPUs are programmed with common rendering commands necessary to render all of the geometry and shading of the scene. The GPUs are then programmed with separate rendering commands to define clipping windows corresponding to image portions 205 and 210.

FIG. 2B illustrates a prior system 212 for programming graphics processing units to perform the same. System 212 uses memory-mapped I/O to communicate rendering commands and data between the CPU 215 and the GPUs 240 and 245. In memory-mapped I/O, commands and data written to a predetermined range of memory addresses is communicated to the GPUs 240 and 245, and conversely, data from the GPUs 240 and 245 can read from the predetermined range of memory addresses by the CPU 215.

Memory map 220 graphically represents the range of available memory addresses in system 212. Memory map contains several apertures, or ranges of memory addresses used to communicate with the GPUs 240 and 245. Broadcast aperture 225 enables the CPU to communicate with all of the GPUs in the system 212 simultaneously. Commands and data written to the broadcast aperture are distributed to all of the GPUs 240 and 245, as well as any other GPUs in the system 222. In some systems, a bridge chip is associated with the broadcast aperture 225 and is adapted to copy data written to the broadcast aperture 225 to each GPU in the system 212.

In addition to the broadcast aperture 225, the memory map also includes a set of unicast apertures 230 and 235. Unicast apertures 235 and 230 are adapted to distribute commands and data to GPUs 240 and 245, respectively. Commands and data written to a unicast aperture will only be distributed to the GPU associated with the unicast aperture. The unicast apertures enable the CPU 215 to program GPUs 230 and 235 separately.

The use of broadcast and unicast apertures to program multiple GPUs introduces several limitations. First, there is typically a separate unicast aperture for each GPU in a system. As each typical unicast aperture can be 256 megabytes in size, systems with a large number of GPUs often need to reserves gigabytes of address space for the apertures. The large address space requirements can limit the performance of systems, and in extreme cases limit the potential number of GPUs in a system, particularly with 32-bit systems that are often limited to 4 gigabytes of total address space. Additionally, some systems require that the GPUs operating in parallel be synchronized. To prevent de-synchronization, when the CPU writes commands and data to one unicast aperture, the CPU must also write null commands and padding data to all of the other unicast apertures. This makes programming individual GPUs very inefficient.

Figure 3:
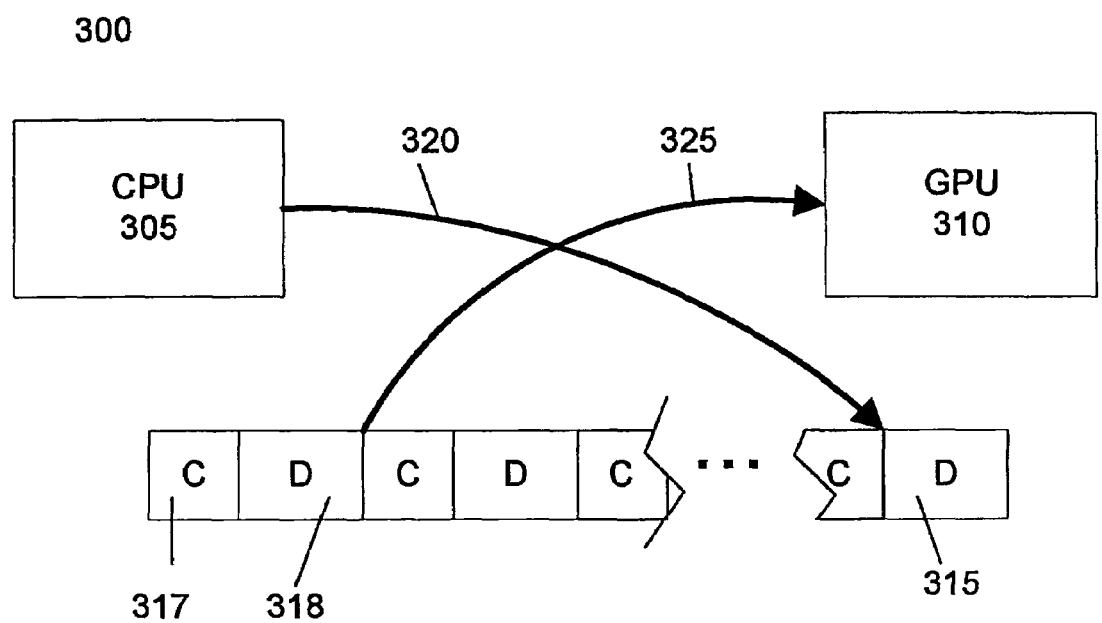
FIG. 3 illustrates a system for communicating rendering commands from a central processing unit (CPU) to a graphics processing unit (GPU) suitable for practicing an embodiment of the invention.

FIG. 3 illustrates a system 300 for communicating rendering commands from a central processing unit (CPU) 305 to a graphics processing unit (GPU) 310 suitable for practicing an embodiment of the invention. In this embodiment, the CPU 305 and the GPU 310 communicate asynchronously through a command buffer 315. Command buffer 315 is stored in memory accessible to both the CPU 305 and the GPU 310. In an embodiment, the command buffer 315 is stored in the computer system's general memory, such as memory 110 discussed in FIG. 1, and is accessible to the GPU 315 via direct memory access (DMA) transfers. Although not shown in FIG. 3, each GPU in a system with multiple GPUs uses a similar command buffer for receiving communications from the CPU 305.

Command buffer 315 stores sets of rendering commands, such as rendering command 317, and sets of rendering data, such as rendering data 318. In one embodiment, a rendering command is associated with rendering data. The rendering command defines the set of rendering processes to be performed by the GPU on an associated rendering data. In a further embodiment, the rendering data is stored in the command buffer 215 adjacent to the corresponding rendering command.

The CPU 305 writes rendering commands and data sets to the command buffer 315. The command buffer 315 can include a number of rendering commands and data sets. The CPU 305 writes commands and data sets into the command buffer 315 at the location determined by "put" pointer 320. Following each CPU write into the command buffer 315, the CPU 305 increments the put pointer 320 to the next unused location in the command buffer 315. In an embodiment, a driver software program executed by the CPU 305 translates high-level rendering commands from a rendering application into commands and data sets, which are then written into the command buffer 315. In a further embodiment, the driver software program receives high-level rendering commands via an application programming interface, for example DirectX™ or OpenGL™.

The GPU 310 reads commands and data sets from the command buffer 315. The GPU 310 reads commands and data sets from the command buffer 315 at the location determined by "get" pointer 325. Following each GPU read from the command buffer 315, the GPU 310 increments the get pointer 325 to the location of the next command or data set in the command buffer 315.

The CPU 305 and GPU 310 can access the command buffer independently. In an embodiment, the CPU 305 periodically adds new commands and data sets to the command buffer 315. Simultaneously, the GPU 310 reads processes commands and data sets previously stored by the CPU 305 continuously. Provided the CPU 305 stays sufficiently far ahead of the GPU 310, the GPU 310 is able to render images without any idle time waiting for the CPU 305. In an embodiment, the CPU 305 writes commands and data sets for frames several frames ahead of the frame being rendered by the GPU 310.

In an embodiment, the command buffer is limited in size. As an example, a typical command buffer is five megabytes in size. When either the get pointer 325 or put pointer 320 reaches the end of the command buffer 315, the pointer is reset to the location of the beginning of the command buffer 315. In this manner, the command buffer 315 "wraps around," enabling the CPU and GPU to access the command buffer 315 in a continuous loop.

Figure 4:
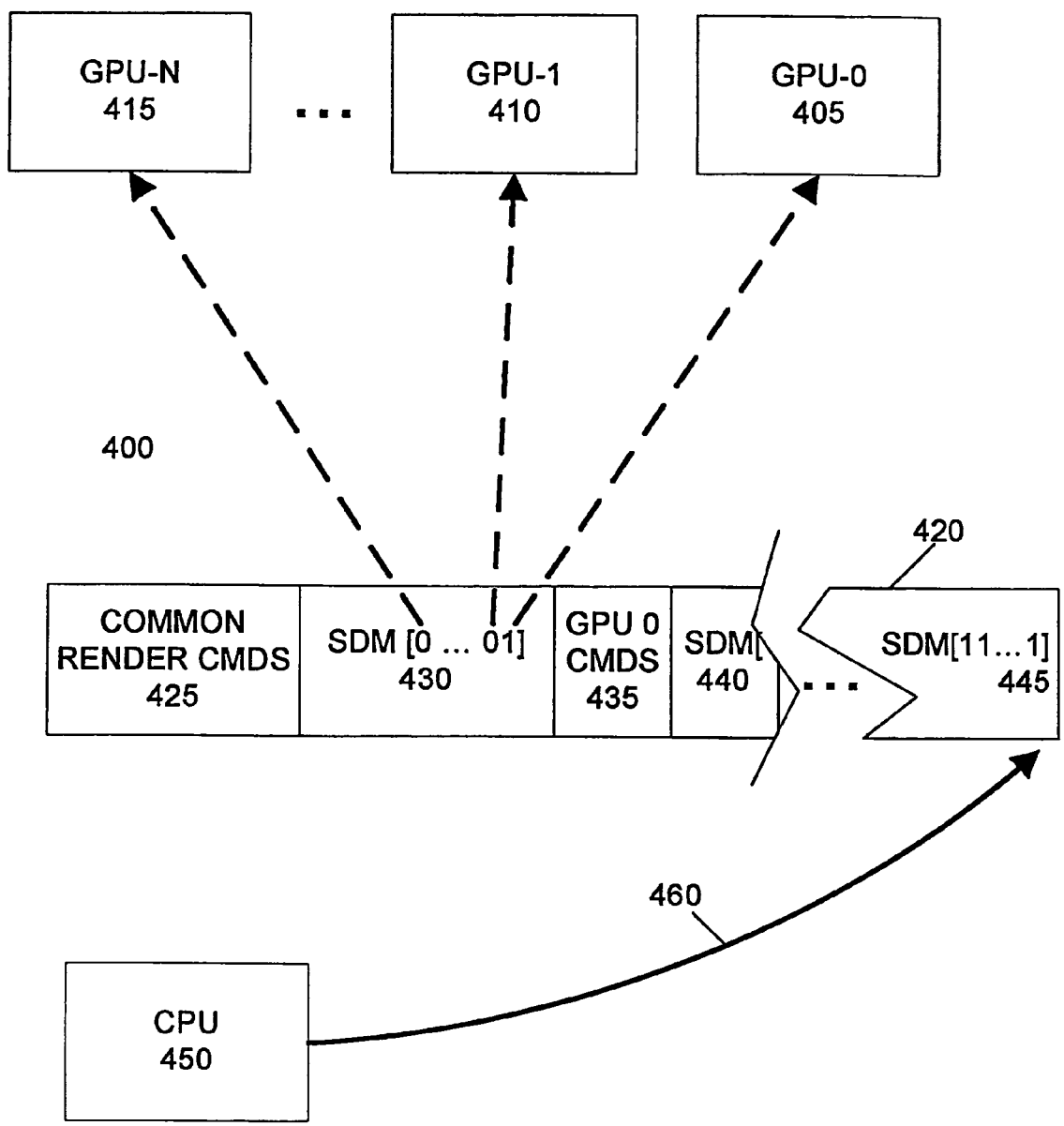
FIG. 4 illustrates a system for programming multiple graphics processing units according to an embodiment of the invention.

FIG. 4 illustrates a system 400 for programming multiple graphics processing units according to an embodiment of the invention. System 400 includes two or more GPUs, for example, ranging from GPU-0, 405 and GPU-1, 410, up to GPU-N 415. All of the GPUs receive programming from the CPU via command buffer 420. As discussed above, CPU 450 adds commands and data sets to the command buffer 420 via put pointer 460. In an embodiment, each GPU reads rendering commands and data sets from the same command buffer. In an alternate embodiment, each GPU has its own identical copy of command buffer 420. In this embodiment, a bridge chip can be used to distribute copies of the command buffer to each of the GPUs. The CPU 450 uses put pointer 460 to write commands and data sets to a broadcast aperture, thereby distributing identical commands and data sets to each of the GPUs.

Command buffer includes common rendering commands and data sets 425, which are to be read and executed by all of the GPUs. To program a subset of the GPUs in the system separately, the CPU writes a Set Device Mask (SDM) command 430 to the command buffer 420. The SDM command 430 designates the subset of GPUs to execute subsequent GPU-specific rendering commands in the command buffer, such as rendering commands 435. As discussed below, GPUs that are not designated by the SDM command 430 will ignore the GPU-specific rendering commands. However, as discussed below, the non-designated GPUs will continue to read from the command buffer to maintain synchronization. A different subset of GPUs can be designated by a second SDM command 440 to execute another group of GPU-specific rendering commands. Following one or more groups of GPU-specific rendering commands, command buffer 420 includes an SDM command 445 designating all of the GPUs in the system. One or more groups of common rendering commands following SDM command 445 will then be executed by all of the GPUs.

In an embodiment, the SDM command 430 includes a device mask designating the GPUs that will execute subsequent rendering commands. In this embodiment, each GPU is assigned a unique identifier. In a further embodiment, these identifier is assigned to each GPU (and a graphics coprocessor, if provided) by a software driver upon system initialization. Each identifier corresponds to a single bit in the device mask. If a bit in the device mask is asserted, then the associated GPU is designated to execute subsequent rendering commands. Conversely, a negated bit instructs a GPU to ignore subsequent rendering commands until its associated bit is reasserted.

For example, SDM command 430 includes a device mask with a value of "10 . . . 0." This device mask indicates that GPU-0, 405, should execute subsequent rendering commands 435, while GPUs 410 and 415 will ignore rendering commands 435. It should be noted that the device mask included with the SDM commands can include any number of bits, thereby enabling the separate programming of any number of GPUs. Further, the device mask can have any combination of asserted or negated bits. This enables the CPU to program two or more GPUs simultaneously. For example, a device mask of "100001111" would indicate that GPUs 0, 1, 2, 3, and 8 are to execute subsequent rendering commands, while GPUs 4, 5, 6, and 7 are to ignore subsequent rendering commands until their corresponding device mask bits are reasserted.

Figure 5:
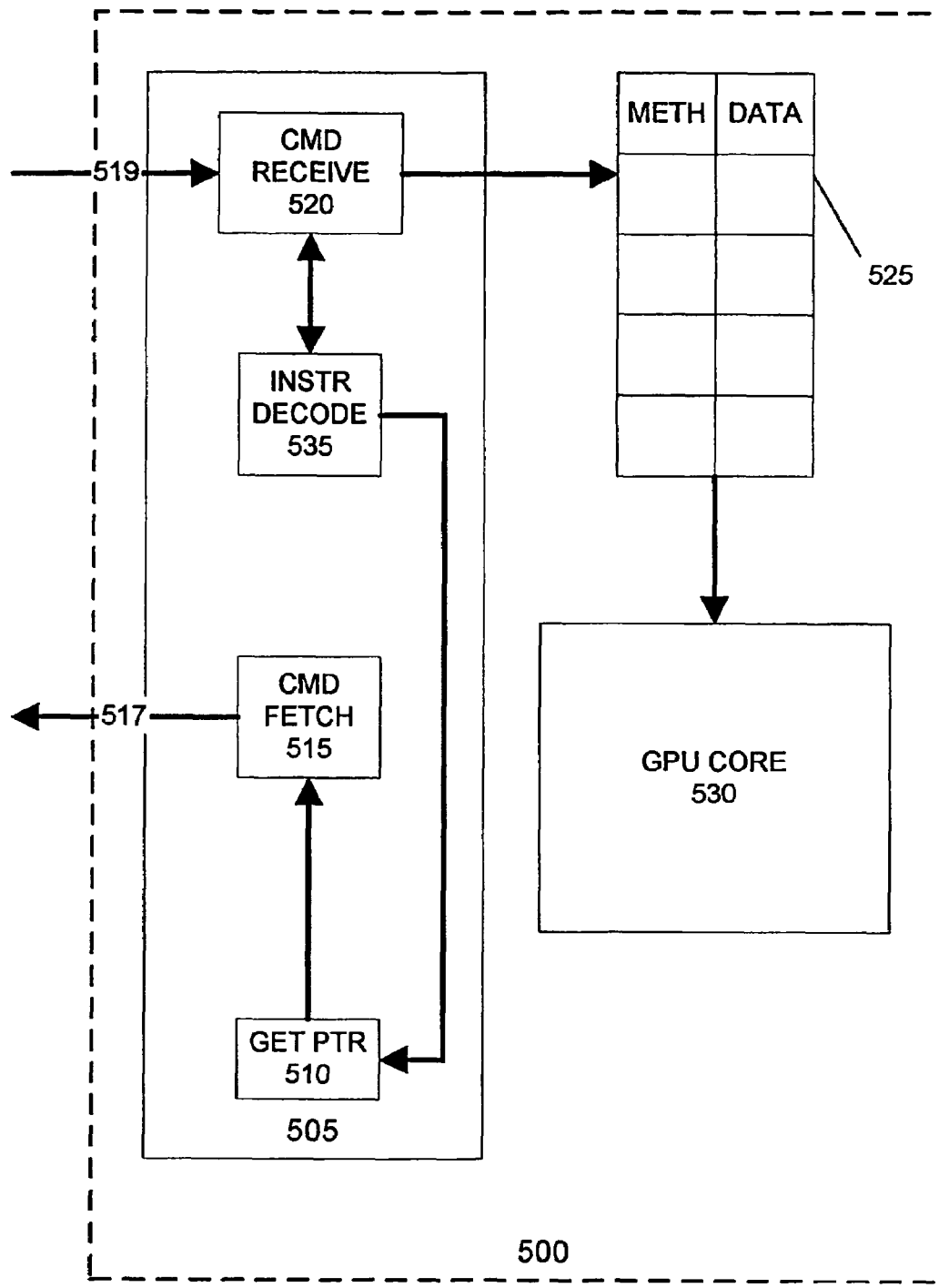
FIG. 5 is a block diagram of a graphics processing unit according to an embodiment of the invention.

FIG. 5 is a block diagram of a graphics processing unit (GPU) 500 according to an embodiment of the invention. GPU 500 includes a GPU front end 505 for retrieving and processing commands from the command buffer and a GPU core 530 for generating pixel data in response to rendering commands. Front end 505 includes a get pointer 510. In an embodiment, the get pointer 510 is stored in a specific memory register. The get pointer 510 is coupled with the command fetch unit 515. Command fetch unit 515 is adapted to initiate the retrieval of a command from the command buffer at the location indicated by the get pointer 510. Command fetch unit 515 sends a command retrieve signal 517 to the command buffer (not shown) to retrieve rendering commands and data sets from the command buffer at the location indicated by the get pointer 510.

Front end 505 includes a command receive unit 520 for receiving a rending command and data 519 from the command buffer. Command receive unit 520 determines whether the received rendering command is an instruction or a method. Rendering command 519 can be classified as either an instruction or a method. Instructions are rendering commands that determine the program flow executed by the GPU 500. Examples of instructions include a jump instruction, which sets the get pointer to a new, non-consecutive location; a no op instructions, which does nothing and is used as a placeholder; and call and return functions, which are used to enter and exit subroutines of rendering commands. The SDM command is also classified as an instruction. Methods are rendering commands that determine the pixel data output by the GPU. In embodiment 500, the front end 505 executes instructions and the GPU core executes methods.

Upon receiving an instruction, the command receive unit 520 forwards the instruction to the instruction decoder 535. Methods are similarly forwarded to method cache 525 to be retrieved and executed by the GPU core 530, subject to the SDM instruction. Upon receiving a SDM instruction, instruction decoder 535 compares the device mask with its own assigned identifier. If the associated bit of the device mask is negated, the instruction decoder 535 disables the link between command receive unit 520 and method cache 525. This causes all subsequent methods received by the GPU 500 to be discarded and ignored.

During the time when GPU 500 is ignoring rendering methods, the front end 505 continues to retrieve rendering commands from the command buffer and to execute instructions. For example, instruction decoder 535 can update the get pointer 510 if indicated by a jump, call, or return instruction. In this manner, the GPU state stays synchronized with the other GPUs, even when the methods of rendering commands are being ignored. Upon receiving a subsequent SDM instruction having the bit associated with GPU 500 reasserted, instruction decoder 535 re-enables the link between the command receive unit 520 and the instruction cache 525. As a result, subsequently received methods are added to the cache 525 and are processed by the GPU core 530.

Figure 6A:
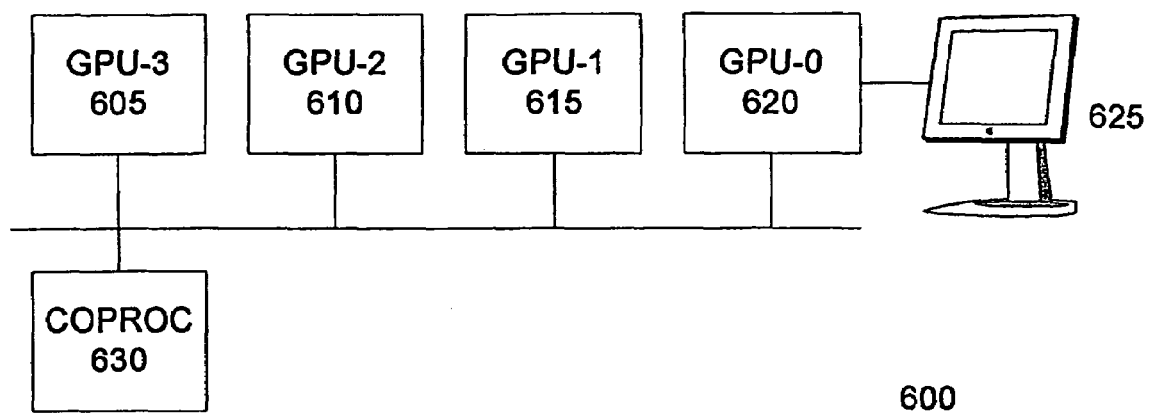
FIGS. 6A and 6B illustrate a system for rendering portions of an image in parallel according to an embodiment of the invention.
Figure 6B:
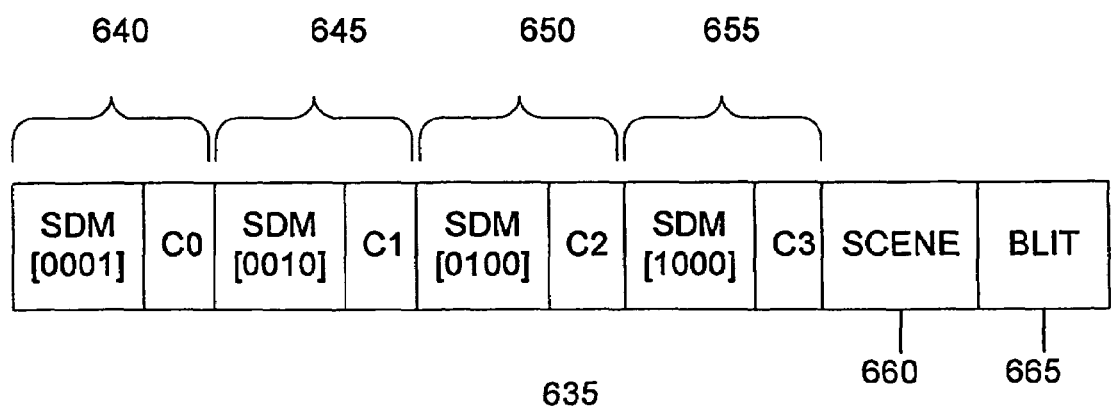

FIGS. 6A and 6B illustrate a system 600 for rendering portions of an image in parallel according to an embodiment of the invention. System 600 includes GPUs 605, 610, 615, and 620; graphics coprocessor 630, and display device 625. In an embodiment, GPUs 605, 610, 615, and 620 are located on separate circuit boards. In a further embodiment, only one GPU is directly connected to the display device 625. In yet a further embodiment, system 600 includes a coprocessor, as 4 separate graphics cards, each card having two separate GPUs. This embodiment has a total of nine different devices that can be programmed separately or simultaneously, as described generally above. Alternate embodiments may have any number of GPUs arranged on any number of circuit boards and may or may not include a coprocessor.

Additional connections (not shown) may be utilized to link GPUs 605, 610, 615, and 620. Also, each GPU may include an internal switching feature that can be controlled to switch between (1) outputting its own pixel data and (2) receiving and forwarding the pixel data of another GPU. By utilizing this internal switching feature, pixel data from any one of the GPUs may be directed through other GPUs to the display device 625. Details of such arrangements for systematically directing the outputs of multiple GPUs to a single display device are discussed in related U.S. application Ser. No. 10/990,712, titled "CONNECTING GRAPHICS ADAPTERS FOR SCALABLE PERFORMANCE" and U.S. patent application Ser. No. 11/012,394, titled "BROADCAST APERTURE REMAPPING FOR MULTIPLE GRAPHICS ADAPTERS", which are mentioned previously.

FIG. 6B illustrates an example command buffer 635 that programs four GPUs and a coprocessor to render portions of an image in parallel. Command set 640 includes a SDM command designating GPU 620. Command set 640 further includes one or more commands specific to GPU 620. In an embodiment, command set 640 includes a command setting the clip region for GPU 620 to the portion of the screen to be rendered by this GPU. Command set 645 includes a SDM command disabling GPU 620 and enabling GPU 615. Similar to command set 640, command set 645 includes a command for setting the clip region for GPU 615 to the portion of the screen to be rendered by GPU 615. Similarly, command sets 650 and 655 set clip regions for GPUs 610 and 605, respectively.

Following the programming of GPU-specific commands using commands sets 640, 645, 650, and 655, a SDM command with a device mask of "1111" is used to enable simultaneous programming of all of the GPUs. Common rendering commands 660 for rendering the scene are executed by all of the GPUs. Following the rendering of the separate portions of the output image, an embodiment of the invention assembles these portions into a complete output image. Blit commands 665 are used to copy the portions rendered by GPUs 605, 610, and 615 to the display memory of GPU 620. Because each image portion must be copied to a different location in the display memory of GPU 620, a further embodiment of blit commands 665 includes a set of SDM commands to selectively program GPUs 605, 610, and 615 with different copy commands. GPU 620 outputs the assembled image to display device 625.

Figure 7A:
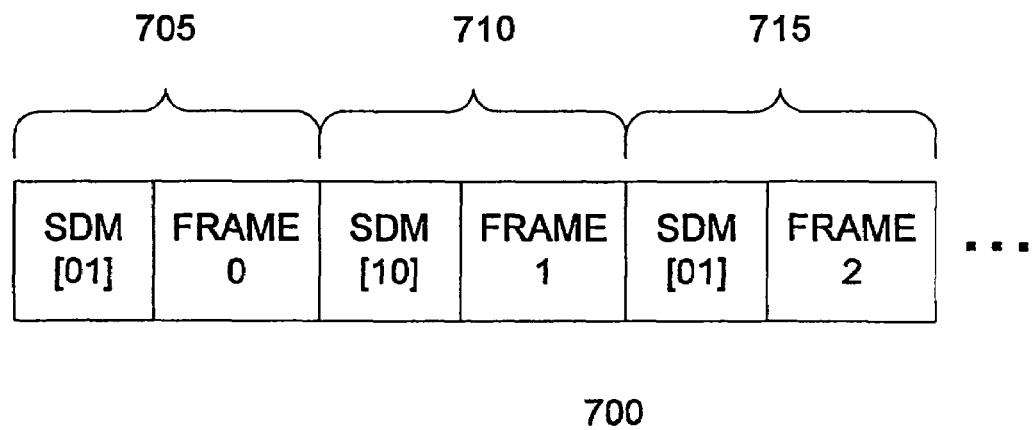
FIGS. 7A and 7B illustrate systems for implementing additional parallel rendering schemes according to an embodiment of the invention.
Figure 7B:
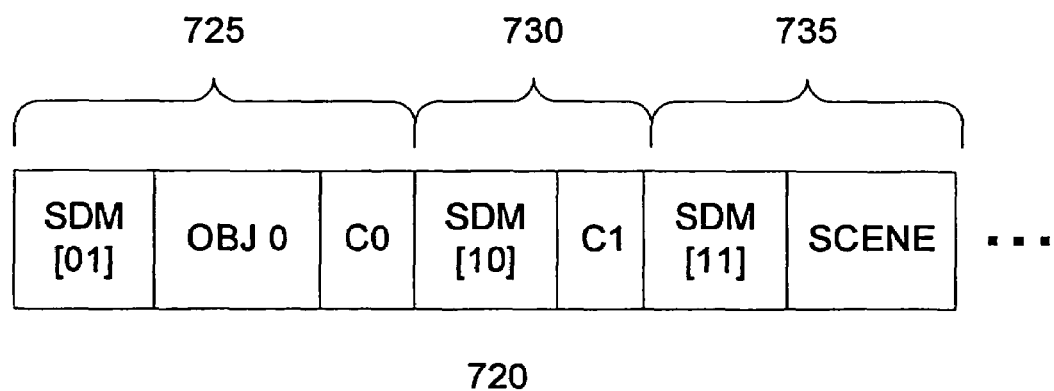

FIGS. 7A and 7B illustrate systems for implementing additional parallel rendering schemes according to an embodiment of the invention. FIG. 7A illustrates an implementation of an alternate frame rendering scheme, which uses different GPUs to simultaneously render different frames. Command buffer 700 includes rendering command set 705. Rendering command set 705 designates a first GPU for programming with rendering commands for frame 0. Rendering command set 705 is followed by rendering command set 710. Rendering command set 710 designates a second GPU for programming with rendering commands for frame 1. The first and second GPUs will render frames 0 and 1 simultaneously. Following rendering command 710, rendering command set 715 programs the first GPU to render frame 2. This pattern of programming is repeated for all subsequent frames. In an alternate embodiment, rendering command set 715 programs a third GPU to render frame 2. In this embodiment, frame 2 is rendered simultaneously with frames 0 and 1. This embodiment can be extended to accommodate any number of GPUs.

FIG. 7B illustrates an example of split frame rendering with software-based geometry culling according to an embodiment of the invention. In this example, the software driver or other middleware application, such as an API runtime component, computes a bounding box for complicated objects. This bounding box is transformed to the image space and compared with the image portions used to divide the rendering of the output image. If the bounding box of an object does not intersect one or more of the image portions, then the rendering commands and data for the object associated with the bounding box can be omitted from the programming of the GPUs assigned to render these image portions. Because rendering commands for the object are omitted for GPUs where the object is not visible, these GPUs avoid wasteful geometry processing and better load balancing is achieved.

Command buffer 720 illustrates an example of the programming used to implement this geometry culling. Command set 725 includes a SDM command designating a first set of GPU-specific commands. These GPU-specific commands include a command setting the clip region for a first GPU to a first portion of the screen to be rendered by this GPU. Command set 725 also includes rendering commands and data for rendering an object visible or potentially visible in the assigned clip region.

Similarly, command set 730 includes a SDM command designating a second set of GPU-specific commands. The second set of GPU-specific commands include a command setting a second clip region for a second GPU to a second portion of the screen to be rendered by this GPU. In this example, the object is not visible or potentially visible in the second clip region. Thus, unlike the command set 725, rendering commands for this object are omitted from command set 730. Command set 735 includes a SDM command enabling simultaneous programming of the first and second GPUs. Command set 735 further includes common rendering commands and data for rendering the remaining elements of the scene.

Figure 8:
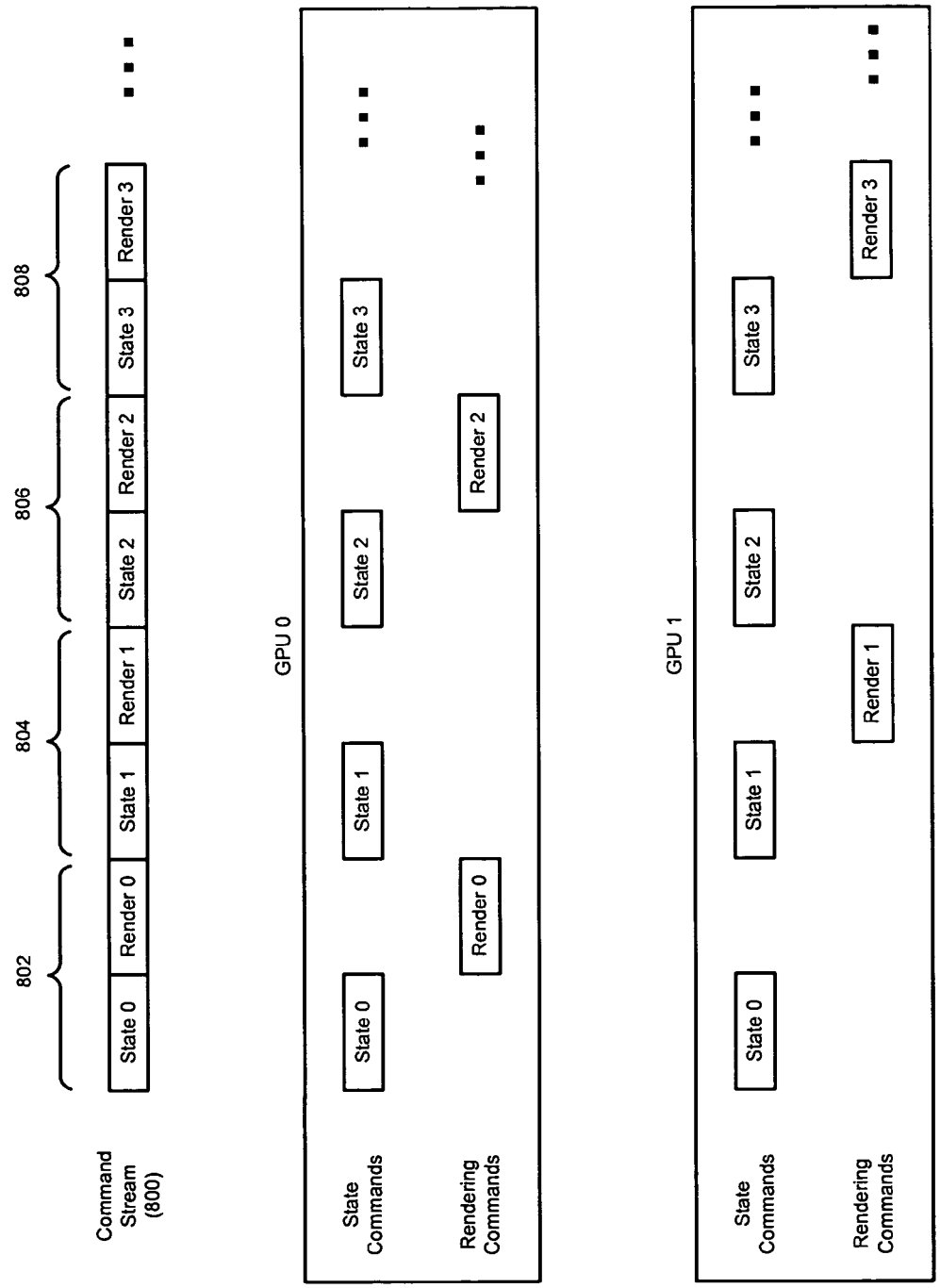
FIG. 8 illustrates the execution of state commands and rendering commands associated with different images by two GPUs operating under an alternate frame rendering scheme, according to one embodiment of the present invention.

FIG. 8 illustrates the execution of state commands and rendering commands associated with different images by two GPUs operating under an alternate frame rendering scheme, according to one embodiment of the present invention. A sequence of images comprising images 0, 1, 2, 3, . . . , and so on, is to be processed such that pixel data for each image may be rendered and displayed on a display device. In the present embodiment of the invention, GPU 0 and GPU 1 process the sequence of images under an alternate frame rendering scheme. Specifically, GPU 0 is responsible for processing images 0, 2, . . . , and so on, and GPU 1 is responsible for processing images 1, 3, . . . , and so on. Each GPU processes images according to instructions provided in command stream 800. While two GPUs are shown in this simple example, it should be understood that more than two GPUs can be operated to process the sequence of images in accordance with the present invention. Referring to FIG. 8, command stream 800 comprises state and rendering commands 802 associated with an image 0, state and rendering commands 804 associated with an image 1, state and rendering commands 806 associated with an image 2, state and rendering commands 808 associated with an image 3, and so on. For ease of illustration, FIG. 8 shows a single state command and a single rendering command for each image. However, each image may be associated with one or more than one state command. Also, each image may be associated with one or more than one rendering command.

According to the present embodiment of the invention, rendering commands may instruct a graphics device to perform one or more specific operations to generate or otherwise modify pixel data for an image. For example, a rendering command may relate to the drawing of a batch of geometric shapes. Arguments for such a rendering command may include a memory location of a buffer that contains information identifying vertices defining the geometric shapes, number of vertices, and type of layout of the vertices (triangles, quadrilaterals, triangle strips, etc.). Another example of a rendering command may relate to the clearing of a rectangular area in an image. Arguments for such a rendering command may include a two-dimensional coordinates defining an origin of the rectangular area, a width value, and a height value. Other rendering commands and variations thereof may also be utilized, as is known in the art.

In the present embodiment, state commands may instruct a graphics device to create, update, or otherwise modify a state that can affect the operation of one or more subsequent rendering commands. For example, a state command may relate to the selection of a current drawing color. An argument for such a state command may be a particular color value, such as a red-green-blue (RGB) color value. Thus, once such a state command sets the current drawing color to say, red, subsequently executed rendering commands may draw objects using the color red—until another state command is executed to change the current drawing color to a different color value. Another example of a state command may relate to the selection of a current texture to be used in texturing operations. As is known in the art, a texturing operation may be akin to applying "wallpaper" of a particular pattern and/or color to a three-dimensional shape. For instance, a "brick" pattern may be applied to a rectangular three-dimensional object, to produce an image of a brick wall. The particular texture, e.g., "brick" pattern, to be applied may be programmable. Thus, a state command may specify the current texture to be applied and may include an argument that specifies a handle that is associated with a particular texture.

Another example of a state command may relate to the selection of a current camera position and may include a parameter that specifies a three-dimensional vector. As is known in the art, objects positioned in three-dimensional space may be initially defined in terms of "world" coordinates that do not take into account any particular viewpoint. To obtain an image of this space from the perspective of a particular viewpoint, or camera position, it may be necessary to define the camera position, which can be specified using a three-dimensional vector. Then, calculations may be performed to derive an image of the scene as perceived from that viewpoint. Thus, a state command for setting the camera position may affect subsequently executed rendering operations to produce images, by defining the viewpoint associated with such images.

Yet another example of a state command relates to the selection of a current pixel shader program and may include a parameter for specifying a handle that is associated with a particular shader program. Rendering operations often include the use of shader programs for calculating the interaction between objects and light. For instance, a shader program may determine effects of different types of reflected light, such as diffusely reflected light that is reflected uniformly with no specific direction or specular reflection that is reflected in a specific direction, as is known in the art. Thus, calculations performed by a shader program may generate different shading depending on the type of surface, angle of lighting, and a variety of other factors, to provide added realism to an image. Different shading programs may be selected for different shading purposes. A state command may thus be used to set the current shading program, which may affect how shading is applied for subsequently performed rendering operations. Other examples of state commands may relate to the selection of graphics memory location and/or attributes of a current rendering buffer. Parameters relating to such state commands may include an offset specifying the beginning of a memory location, as well as width, height, aliasing sampling method, etc., associated with the rendering buffer. Other state commands and variations thereof may also be utilized, as is known in the art.

As shown in FIG. 8, GPU 0 only executes rendering commands from command stream 800 associated with those images it is responsible for processing—images 0, 2, ..., and so on. However, GPU 0 executes state commands from command stream 800 associated with each image in the sequence—images 0, 1, 2, 3, and so on. GPU 0 operates in this manner because state commands associated with images for which GPU 0 is not responsible for processing may nevertheless affect rendering operations performed by GPU 0. For example, command stream 800 may be generated to draw a particular object in image 2 using the color red. To accomplish this, command stream 800 may set the current drawing color to "red" prior to GPU 0's execution of a rendering command associated with image 2 for drawing the object. This may be done using a state command that does not necessarily correspond to an image rendered by GPU 0. For instance, the current drawing color may be set to "red" by a state command associated with image 1. In that case, if GPU 0 only executes state commands associated with images for which it is responsible for processing, namely images 0, 2, ..., and so on, GPU 0 would miss the execution of the appropriate state command for setting the current color to "red." Consequently, GPU 0 may draw the object in image 2 using an incorrect color. Thus, according to the present embodiment of invention, GPU 0 executes state commands for each image in the sequence of images, including images for which GPU 0 does not perform rendering operations. This allows GPU 0 to maintain state updates correctly, so that GPU 0 can perform rendering operations to produce intended results.

In a similar fashion, FIG. 8 shows that GPU 1 only executes rendering commands from command stream 800 associated with those images it is responsible for processing—images 1, 3, ..., and so on. However, GPU 1 executes state commands from command stream 800 associated with each image in the sequence—images 0, 1, 2, 3, and so on. GPU 1 thus maintains state updates correctly, to perform rendering operations and produce intended results. While two GPUs are shown in FIG. 8, it should be understood that more than two GPUs may be utilized to distribute processing of the sequence of images in accordance with the invention.

Figure 9:
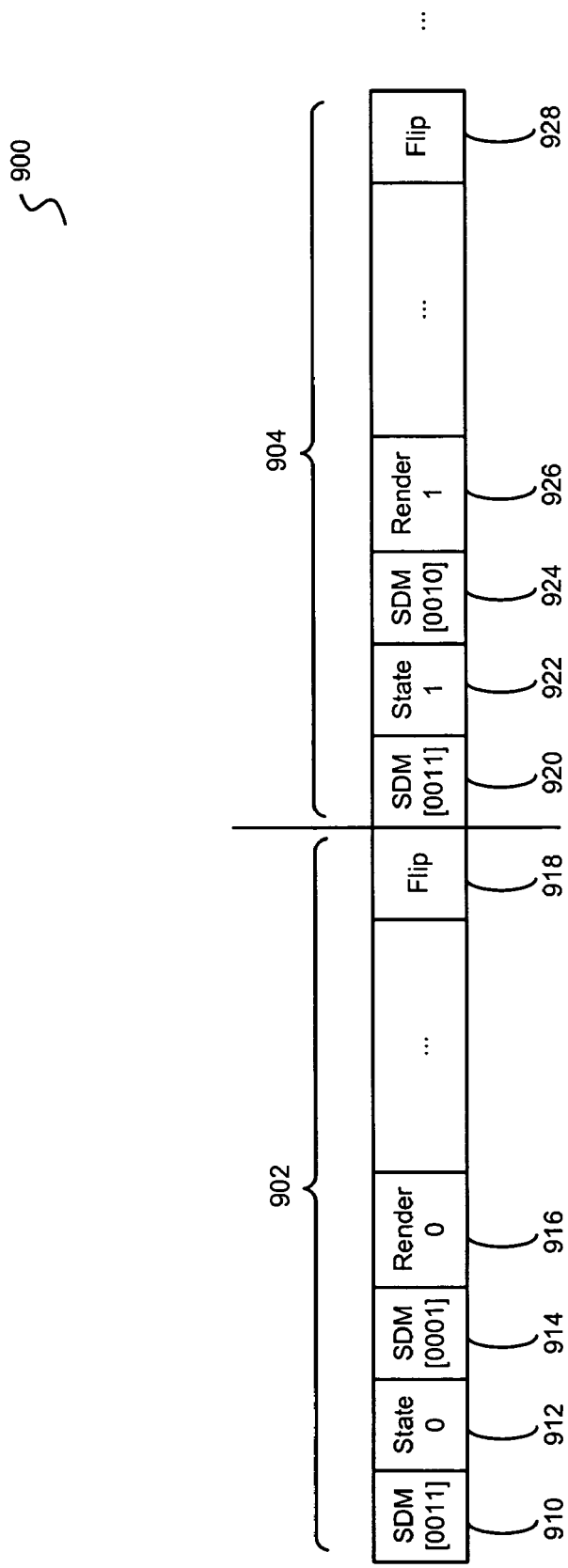
FIG. 9 depicts a command stream employing Set Device Mask (SDM) commands to designate GPUs to execute appropriate state and rendering commands, in accordance with one embodiment of the invention.

FIG. 9 depicts a command stream 900 employing Set Device Mask (SDM) commands to designate GPUs to execute appropriate state and rendering commands, in accordance with one embodiment of the invention. As shown in the figure, command stream 900 comprises commands 902 associated with image 0 and commands 904 associated with image 1. In addition, command stream 900 may also comprise commands (not shown) associated with other images in the sequence of images 0, 1, 2, 3, ..., and so on. Here, the sequence of images are processed by two GPUs, referred to as GPU 0 and GPU 1, under an alternate frame rendering scheme as described previously. Specifically, GPU 0 is responsible for processing images 0, 2, ..., and so on, and GPU 1 is responsible for processing images 1, 3, ..., and so on.

Commands 902 associated with image 0 comprise an SDM command 910, a state command 912, an SDM command 914, a rendering command 916, and other commands. As mentioned previously, each SDM command includes a device mask whose value indicates which device(s) are to execute subsequent commands, until a new SDM command is encountered. In this example, a device mask having an asserted value in the "000x" bit position indicates that GPU 0 is to execute subsequent commands. Also, a device having an asserted value in the "00x0" bit position indicates that GPU 1 is to execute subsequent commands. In FIG. 9, SDM command 910 includes a device mask having a value of "0011"—indicating that both GPU 0 and GPU 1 are to execute subsequent commands. Here, state command 912 is the next command. Thus, state command 912 is to be executed by both GPU 0 and GPU 1. As discussed above, it may be advantageous to allow both GPU 0 and GPU 1 to execute a state command in the sequence of commands, regardless of which image the state command happens to be associated with. This allows both GPUs to maintain state updates correctly for subsequent rendering operations.

The following command in commands 902 is SDM command 914, which includes a device mask having a value of "0001"—indicating that only GPU 0 is to execute subsequent commands. Rendering command 916 is the next command. Thus, rendering command 916 is to be executed only by GPU 0. This comports with the alternate frame rendering scheme mentioned above in which GPU 0 is responsible for executing rendering commands associated with image 0 (as well as images 2, 4, ...). Specifically, rendering command 916 is a rendering command associated with image 0 and is processed by GPU 0. While FIG. 9 shows commands 902, associated with image 0, as including only one state command and one rendering command, commands 902 may in fact comprise additional state commands and/or rendering commands. More SDM commands may be employed amongst commands 902 to properly instruct GPU 0 and/or GPU 1 as to which subsequent command(s) to execute, in a similar manner as described above.

A flip command 918 is shown at the end of commands 902 associated with image 0. According to one embodiment of the invention, each GPU comprises a rendering module for performing rendering operations to generate pixel data for images and write the pixel date to memory, as well as a scanout module for scanning the pixel data from memory to a display. In this embodiment, the memory utilized is "double buffered," as is known in the art. Specifically, the memory utilized for storing pixel data may include a "front buffer" and a "back buffer." The rendering module may freely overwrite the back buffer with pixel data for a new image while the scanout module reads and scans out pixel data for the current image from the front buffer. When another image is to be processed, "flipping" of the back and front buffers occurs so that the back buffer becomes the new front buffer from which pixel data is read and scanned out, and the front buffer becomes the new back buffer to which pixel data for the newest image is written. Flip command 918 corresponds to such a flip operation. SDM command 914, or another SDM command (not shown), may indicate that GPU 0 is to execute flip command 918 and thus begin processing the next image. Here, the next image to be processed by GPU 0 may be image 2.

Commands 904 associated with image 1 comprise an SDM command 920, a state command 922, an SDM command 924, a rendering command 926, and other commands. In a similar manner as described above, each SDM command includes a device mask whose value indicates which device(s) are to execute subsequent commands, until a new SDM command is encountered. Here, SDM command 920 includes a device mask having a value of "0011"—indicating that both GPU 0 and GPU 1 are to execute subsequent commands. State command 922 is the next command. Thus, state command 922 is to be executed by both GPU 0 and GPU 1.

The following command in commands 904 is SDM command 924, which includes a device mask having a value of "0010"—indicating that only GPU 1 is to execute subsequent commands. Rendering command 926 is the next command. Thus, rendering command 926 is to be executed only by GPU 1. This comports with the alternate frame rendering scheme in which GPU 1 is responsible for executing rendering commands associated with image 1 (as well as images 3, 5, . . . ). While FIG. 9 shows commands 904 associated with image 1 as including only one state command and one rendering command, commands 904 may in fact comprise additional state commands and/or rendering commands. More SDM commands may be employed amongst commands 904 to properly instruct GPU 0 and/or GPU 1 as to which subsequent command(s), in a manner similar to that shown above. A flip command 928 is shown at the end of commands 904 associated with image 1. Flip command 904 corresponds to a flip operation to begin processing of the next image. Here, the next image to be processed by GPU 1 may be image 3.

Thus, by utilizing SDM commands, a single command stream such as command stream 900 may include commands to be executed by different ones or different combinations of graphics devices, such as GPU 0 and GPU 1. Specifically, where a state command needs to be executed by all GPU utilized to process a sequence of images, regardless of which images each GPU is responsible for processing, an appropriate SDM command preceding the state command may designate all of the GPUs so that they execute the state command. Where a rendering command needs to be executed by a particular one of the GPUs, an appropriate SDM command preceding the rendering command may designate the selected GPU that is to execute the rendering command. The single command stream may then be received by numerous GPUs, with each GPU deciphering the SDM commands and determining whether to execute commands following each SDM command, according to the device mask contained in the SDM command. A command stream such as command stream 900 may be communicated to one or more GPUs in various ways, such as described previously.

Figure 10:
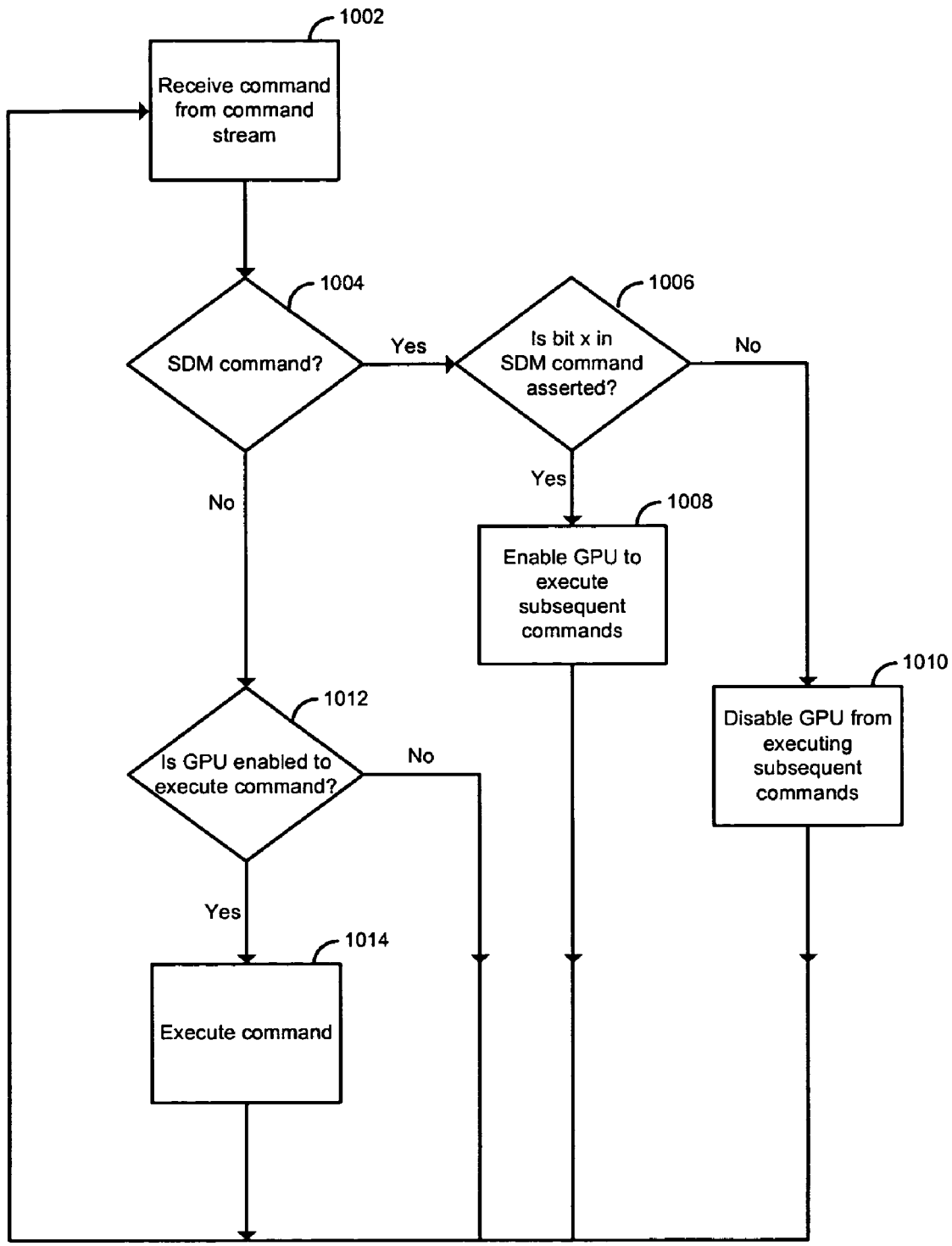
FIG. 10 is a flow chart presenting illustrative steps performed at a GPU to selectively execute commands received from a command stream, in accordance with one embodiment of the invention.

FIG. 10 is a flow chart presenting illustrative steps performed at a GPU to selectively execute commands received from a command stream, in accordance with one embodiment of the invention. In a step 1002, a command is received from a command stream. At a step 1004, the command is examined to determine if it is an SDM command. If so, the process continues to a step 1006. In step 1006 a particular bit position, corresponding to the GPU, of a device mask contained in the SDM command is examined, as discussed previously. If the bit position corresponding to the GPU is asserted, the process continues to a step 1008. In step 1008, the GPU is enabled to execute subsequently received commands (until another SDM command is received to indicate otherwise). For example, the bit position corresponding to the GPU may be asserted if one or more subsequent commands in the command stream is a state command that is to be executed by all GPUs utilized to process a sequence of images. As another example, the bit position may be asserted if one or more subsequent commands in the command stream is a rendering command that is to be executed by this GPU. After step 1008, the process restarts at step 1002.

Referring back to step 1006, if the bit position corresponding to the GPU is not asserted, the process continues to a step 1010. In step 1010, the GPU is disabled from executing subsequently received commands (until another SDM command is received to indicate otherwise). For example, the bit position corresponding to the GPU may be cleared if one or more subsequent commands in the command stream is a rendering command that is to be executed by another GPU. After step 1010, the process restarts at step 1002.

Referring back to step 1004, if the received command is not an SDM command, the process continues to step 1012. In step 1012, it is determined whether the GPU is enabled to execute the received command. The GPU may have been previously enabled to execute commands, for example, in step 1008. The GPU may have been previously disabled from executing commands, for example, in step 1010. If the GPU is enabled to execute the received command, the process continues to a step 1014, in which the GPU executes the received command. After step 1014, the process restarts at step 1002. If in step 1012 it is determined that the GPU is not enabled to execute the received command, the process skips step 1014 and restarts at 1002.

What is claimed is:

1. A method for operating a plurality of graphics devices comprising:

using the plurality of graphics devices, including at least one first graphics device and at least one second graphics device, to process a sequence of images, including a first image and a second image, wherein the at least one first graphics device processes the first image, and the at least one second graphics device processes the second image;

communicating a first command associated with the first image to the at least one first graphics device and the at least one second graphics device, wherein the first command is to be executed by the at least one first graphics device and by the at least one second graphics device; and communicating a second command associated with the first image to the at least one first graphics device and the at least one second graphics device, wherein the second command is to be executed by the at least one first graphics device but not by the at least one second graphics device, wherein the plurality of graphics devices are configured to receive commands via a command buffer shared by the plurality of graphic devices, wherein the first command and the second command are communicated to at least one first graphics device and the at least one second graphics device via the command buffer.

2. The method of claim 1 wherein the first command is preceded by a first prior command designating the at least one first graphics device and at least one second graphics device to execute the first command, and the second command is preceded by a second prior command designating the at least one first graphics device to execute the second command.

3. The method of claim 2,
wherein the first prior command designates the at least one first graphics device by utilizing a first bit position in the first prior command;
wherein the first prior command designates the at least one second graphics device by utilizing a second bit position in the first prior command; and
wherein the second prior command designates the at least one first graphics device by utilizing a first bit position in the second prior command.

4. The method of claim 1 wherein each of the at least one first graphics device and at least one second graphics device comprises a graphics processing unit (GPU).

5. The method of claim 1 wherein the first command comprises a state command associated with the first image, and the second command comprises a rendering command associated with the first image.

6. The method of claim 5 wherein the state command relates to selection of a current drawing color.

7. The method of claim 5 wherein the state command relates to selection of a current texture to be used in texturing operations.

8. The method of claim 5 wherein the state command relates to selection of a current view point.

9. The method of claim 5 wherein the state command relates to selection of a current pixel shader program.

10. The method of claim 5 wherein the rendering command relates to drawing of at least one geometric shape.

11. The method of claim 5 wherein the rendering command relates to clearing of a rectangular area in an image.

12. An apparatus for processing graphics images comprising:
at least one first graphics device capable of processing a first image from a sequence of images;
at least one second graphics device capable of operating in parallel with the at least one first graphics device and processing a second image from the sequence of images;
wherein the at least one first graphics device and at least one second graphics device are capable of receiving a first command associated with the first image wherein the first command is to be executed by the at least one first graphics device and by the at least one second graphics device; and
wherein the at least one first graphics device and at least one second graphics device are capable of receiving a second command associated with the first image, wherein the second command is to be executed by the at least one first graphics device but not by the at least one second graphics device,
wherein the at least one first graphics device and the at least one second graphics device are configured to receive commands via a shared command buffer accessible by each of the graphics devices, wherein the first command and the second command are communicated to at least one first graphics device and the at least one second graphics device via the command buffer.

13. The apparatus of claim 12 wherein each of the at least one first graphics device and at least one second graphics device comprises:
a core unit adapted to execute commands;
a front-end unit adapted to receive commands and communicate the received commands with the core unit; and
wherein the front-end unit is further adapted to suspend the communication of received commands with the core unit following the receipt of a command of a first type.

14. The apparatus of claim 13, wherein the front-end unit is further adapted to resume the communication of received commands with the core unit following the receipt of a command of a second type.

15. The apparatus of claim 12 wherein the first command is preceded by a first prior command designating the at least one first graphics device and at least one second graphics device to execute the first command, and the second command is preceded by a second prior command designating the at least one first graphics device to execute the second command.

16. The apparatus of claim 12,
wherein the first prior command designates the at least one first graphics device by utilizing a first bit position in the first prior command;
wherein the first prior command designates the at least one second graphics device by utilizing a second bit position in the first prior command; and
wherein the second prior command designates the at least one first graphics device by utilizing a first bit position in the second prior command.

17. The apparatus of claim 12 wherein each of the at least one first graphics device and at least one second graphics device comprises a graphics processing unit (GPU).

18. The apparatus of claim 12 wherein the first command comprises a state command associated with the first image, and the second command comprises a rendering command associated with the first image.

19. A system for operating a plurality of graphics devices comprising:
means for using the plurality of graphics devices, including at least one first graphics device and at least one second graphics device, to process a sequence of images, including a first image and a second image, wherein the at least one first graphics device processes the first image, and the at least one second graphics device processes the second image;
means for communicating a first command associated with the first image to the at least one first graphics device and the at least one second graphics device, wherein the first command is to be executed by the at least one first graphics device and by the at least one second graphics device; and
means for communicating a second command associated with the first image to the at least one first graphics device and the at least one second graphics device, wherein the second command is to be executed by the at least one first graphics device but not by the at least one second graphics device,
wherein the plurality of graphics devices are configured to receive commands via a command buffer shared by the plurality of graphic devices, wherein the first command and the second command are communicated to at least one first graphics device and the at least one second graphics device via the command buffer.

* * * * *